(12) United States Patent
Burton

(10) Patent No.: US 10,471,882 B2
(45) Date of Patent: *Nov. 12, 2019

(54) LIGHT MODULE FASTENING ASSEMBLY HAVING A SNAP WEDGE ASSEMBLY WITH BALL STUD AND INSERT

(71) Applicant: Burton Technologies, LLC, Ludington, MI (US)

(72) Inventor: John E. Burton, Ludington, MI (US)

(73) Assignee: Burton Technologies, LLC, Ludington, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/124,879

(22) Filed: Sep. 7, 2018

(65) Prior Publication Data

US 2019/0001865 A1    Jan. 3, 2019

Related U.S. Application Data

(63) Continuation of application No. 15/196,665, filed on Jun. 29, 2016, now Pat. No. 10,093,221.
(Continued)

(51) Int. Cl.
*B60Q 1/04* (2006.01)
*F16B 5/02* (2006.01)
(Continued)

(52) U.S. Cl.
CPC .......... *B60Q 1/0441* (2013.01); *B60Q 1/045* (2013.01); *B60Q 1/0408* (2013.01);
(Continued)

(58) Field of Classification Search
CPC .............. B60Q 1/0441; B60Q 2200/32; B60Q 1/0683; B60Q 1/263; F21S 41/198
See application file for complete search history.

(56) References Cited

U.S. PATENT DOCUMENTS

| 2,266,329 A | 12/1941 | Meat et al. |
| 2,826,682 A | 9/1953 | Falge |

(Continued)

FOREIGN PATENT DOCUMENTS

| CN | 103363414 | 4/2012 |
| DE | 20108408 | 5/2001 |

(Continued)

OTHER PUBLICATIONS

Search Report dated Oct. 20, 2016 for European Patent Application No. 16178254.5.
(Continued)

*Primary Examiner* — Robert J May
(74) *Attorney, Agent, or Firm* — James Joyce; Godfrey & Kahn, S.C.

(57) ABSTRACT

A snap wedge assembly is provided that includes a ball stud having a ball end configured for engagement with a light module, and an insert coupled with the ball stud, the insert comprising an insert first end and an insert second end, a plurality of wedges, each having wedge side surfaces and a wedge top surface that extend longitudinally from the insert first end towards the insert second end, wherein the wedge top surface tapers outward as it extends towards the ball end, and a plurality of snap fingers, the snap fingers each including an elongated flexible portion and a latching portion.

21 Claims, 18 Drawing Sheets

Related U.S. Application Data

(60) Provisional application No. 62/189,551, filed on Jul. 7, 2015.

(51) Int. Cl.
   *F16B 5/06* (2006.01)
   *F16B 21/16* (2006.01)
   *F21S 41/19* (2018.01)
   *F21S 41/141* (2018.01)

(52) U.S. Cl.
   CPC .......... *B60Q 1/0483* (2013.01); *F16B 5/0241* (2013.01); *F16B 5/0628* (2013.01); *F16B 21/16* (2013.01); *F21S 41/141* (2018.01); *F21S 41/198* (2018.01); *B60Q 2200/32* (2013.01)

(56) References Cited

U.S. PATENT DOCUMENTS

| | | |
|---|---|---|
| 3,062,489 A | 11/1962 | Zook |
| 3,385,546 A | 5/1968 | Scowen |
| 3,502,862 A | 3/1970 | Hedgewick et al. |
| 3,823,314 A | 7/1974 | Germany |
| 4,188,655 A | 2/1980 | Tallon |
| 4,196,459 A | 4/1980 | Dick |
| 4,306,276 A | 12/1981 | Dick |
| 4,574,334 A | 3/1986 | Igura |
| 4,599,681 A | 7/1986 | McMahan |
| 5,003,436 A | 3/1991 | Yamada et al. |
| 5,063,481 A | 11/1991 | Martin |
| 5,258,894 A | 11/1993 | Bivens |
| 8,029,176 B2 | 10/2011 | Shih |

FOREIGN PATENT DOCUMENTS

| | | |
|---|---|---|
| GB | 2375569 | 11/2002 |
| JP | 2013-175415 | 2/2012 |
| WO | WO2011/149952 | 5/2010 |

OTHER PUBLICATIONS

Search Report dated Jul. 7, 2016 for Chinese Patent Application No. 201610531744.5.

Office Action dated Jan. 31, 2018 for Chinese Patent Application No. 201610531744.5.

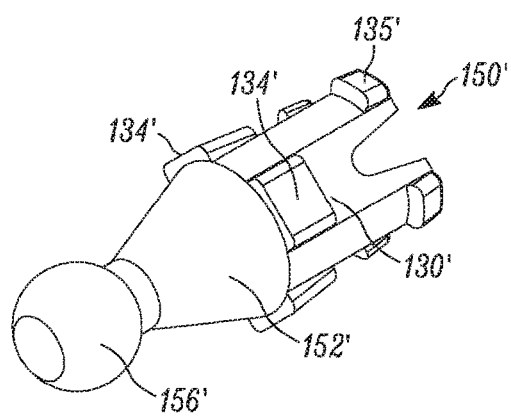 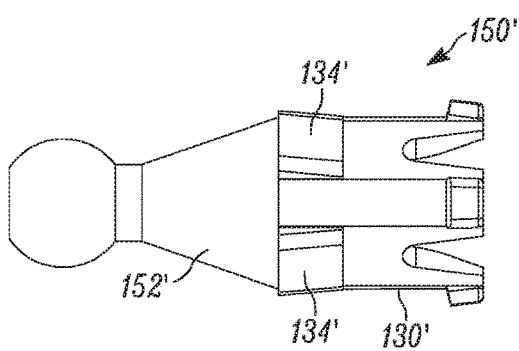
FIG. 13A    FIG. 13B
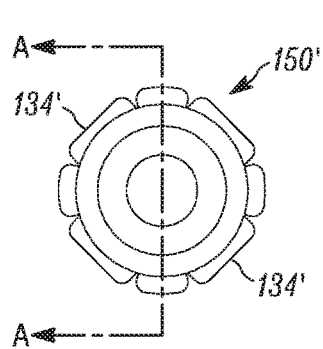 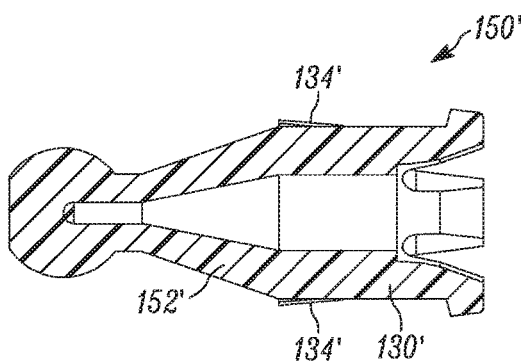
FIG. 13C    FIG. 13D

LIGHT MODULE FASTENING ASSEMBLY HAVING A SNAP WEDGE ASSEMBLY WITH BALL STUD AND INSERT

CROSS-REFERENCE

This application is a continuation of U.S. patent application Ser. No. 15/196,665 filed on Jun. 29, 2016, and is based on U.S. Provisional Patent Application Ser. No. 62/189,551 filed on Jul. 7, 2015, from both of which priority is claimed and the disclosures of which are incorporated herein by reference for all purposes.

FIELD

The present invention relates generally to the field of headlamps. More particularly, the present invention relates to a fastener assembly for securing and aiming light modules used in a headlamp.

BACKGROUND

Automotive headlamp assemblies have begun using LED light modules as a principal light source. The use of LEDs permits new and unique design possibilities not possible with traditional light sources. The use of LED light modules generally requires multiple modules to be combined on a single headlamp assembly. One method of attaching several LED light modules to a headlamp assembly is by mounting them to an adjustable carrier bracket portion of a headlamp assembly, where the LED light modules are all secured to the carrier bracket. The carrier bracket is mounted to the vehicle using one or more conventional headlamp assembly adjusters so as to permit simultaneous aiming of all the LED light modules secured to the carrier bracket. Of course, it is also often necessary and desirable to individually aim each LED module. Given the small space constraints involved, conventional right angle, or other similar adjusters cannot be effectively used and manufacturers have been using basic screw and nut adjusters to accomplish the mounting of the LED light modules to the adjustable carrier bracket.

Existing through hole snap-in screw-nut designs are not proportioned well to scale down and become a robust micro-adjuster with good screw support and snap fit rigidity. Non-snap in type designs (like a separate screw & nut) also have many disadvantages, including being more labor intensive and costly to assemble. With the growing trend for multiple LED light modules to be used collectively as the primary low beam pattern in an automobile headlamp assembly, there is a need for reliable, secure, and easy to assemble adjusters to support and aim each LED light module to meet the legally required beam pattern of the federal motor vehicle safety standard (FMVSS). Further, due to the extreme brightness of LED light sources, when used in vehicle headlamps, it is necessary to ensure that each light module can be properly and securably aimed.

SUMMARY OF THE INVENTION

While one possible application of the invention is in headlamp assemblies, many other applications are possible and references to use in a headlamp assembly should not be deemed to limit the uses of the present invention. The advantages of the present invention will become apparent from the detailed description and accompanying drawings.

In at least some embodiments, the invention is directed to a snap wedge assembly that includes a ball stud having a ball end configured for engagement with a light module; and an insert coupled with the ball stud, the insert comprising: an insert first end and an insert second end; a plurality of wedges each having wedge side surfaces and a wedge top surface that extends longitudinally from the insert first end towards the insert second end; and a plurality of snap fingers, the snap fingers each including an elongated flexible portion and a latching portion.

In at least some other embodiments, the invention is directed to a fastening assembly for securing a light module to a carrier bracket of a vehicle headlamp assembly, the fastening assembly comprising: a snap wedge assembly comprising: a ball stud having a ball end configured for engagement with a light module; and an insert coupled with the ball stud, the insert comprising: an insert first end and an insert second end; a plurality of wedges each having wedge side surfaces and a wedge top surface that extends longitudinally from the insert first end towards the insert second end; and a plurality of snap fingers, the snap fingers each including an elongated flexible portion and a latching portion; and a carrier receptacle for matingly receiving and securing the snap wedge assembly, wherein the carrier receptacle is at least one of formed integrally with or secured to a carrier bracket, the carrier receptacle comprising: a receptacle front wall and a receptacle rear wall; a receptacle passage extending between the receptacle front wall and the receptacle rear wall, and having a receptacle interior surface; and a plurality of wedge pockets situated along the receptacle interior surface for matingly receiving the wedges, the wedge pockets including a top pocket wall and side pocket walls.

In at least some other additional embodiments, the invention is directed to a vehicle headlight assembly that includes a plurality of snap wedge assemblies, at least one of the snap wedge assemblies comprising: a ball stud having a ball end configured for engagement with a light module; and an insert coupled with the ball stud, the insert comprising: an insert first end and an insert second end; a plurality of wedges each having wedge side surfaces and a wedge top surface that extends longitudinally from the insert first end towards the insert second end; and a plurality of snap fingers, the snap fingers each including an elongated flexible portion and a latching portion; and a plurality of carrier receptacles for matingly receiving and securing the snap wedge assemblies, wherein the carrier receptacles are at least one of formed integrally with or secured to a carrier bracket, at least one of the carrier receptacles comprising: a receptacle front wall and a receptacle rear wall; a receptacle passage extending between the receptacle front wall and the receptacle rear wall, and having a receptacle interior surface; and a plurality of wedge pockets situated along the receptacle interior surface for matingly receiving the wedges, the wedge pockets including a top pocket wall and side pocket walls, wherein the ball ends of the plurality of snap wedge assemblies are coupled to a single light module.

Further, in at least some yet further additional embodiments, the invention is directed to a fastening assembly for securing a light module to a carrier bracket of a vehicle headlamp assembly, the fastening assembly comprising: a snap wedge assembly comprising: a ball stud having a ball end configured for engagement with a light module; and an insert coupled with the ball stud, the insert comprising: an insert front wall and an insert rear wall; a plurality of rotation stops that extends longitudinally from the insert front wall towards the insert rear wall; and a plurality of snap fingers, the snap fingers each including an elongated flexible portion and a latching portion; and a carrier receptacle for matingly receiving and securing the snap wedge assembly, wherein the carrier receptacle is at least one of formed integrally with or secured to a carrier bracket, the carrier receptacle comprising: a receptacle passage having a receptacle interior surface; and a plurality of beveled corners situated along the receptacle interior surface complementarily shaped to matingly engage the rotation stops.

BRIEF DESCRIPTION OF THE DRAWINGS

Embodiments of the fastening assembly are disclosed with reference to the accompanying exemplary drawings, which are for illustrative purposes. Various portions of the assembly may be omitted from illustrations or illustrated with dashed lines in one or more FIGS. in order to provide a view of underlying components. The fastening assembly is not limited in application to the details of construction or the arrangement of the components illustrated in the drawings. The fastening assembly is capable of other embodiments or of being practiced or carried out in various other ways. In the drawings:

FIG. 13A is a perspective view of the snap wedge assembly of FIG. 12;

FIG. 13B is a side view of the snap wedge assembly of FIG. 13A;

FIG. 13C is a top view of the snap wedge assembly of FIG. 13A;

FIG. 13D is a cross-sectional view of the snap wedge assembly of FIG. 13C taken along line A-A;

DETAILED DESCRIPTION

Figure 1:
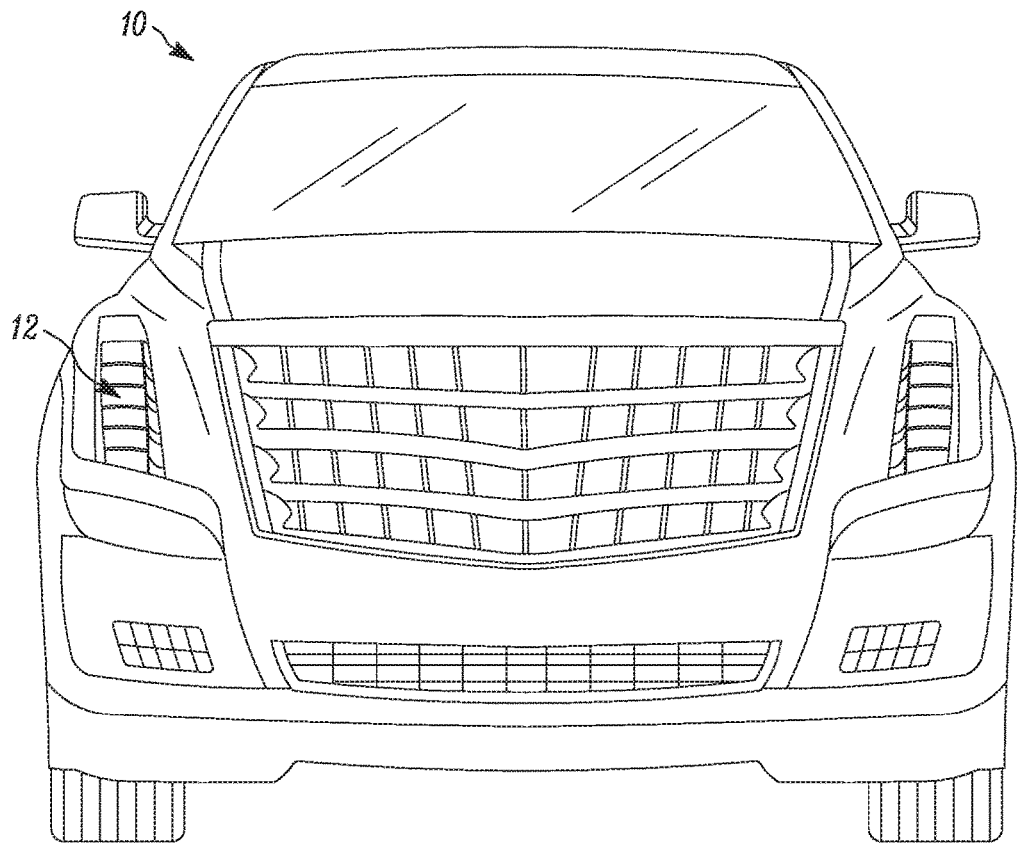
FIG. 1 is a front view of an exemplary vehicle with exemplary LED headlamp assemblies.

While the light module fastener assembly may be susceptible to embodiment in different forms, there are shown in the drawings, and herein will be described in detail, certain illustrative embodiments with the understanding that the present disclosure is to be considered an exemplification of the principles of the light module fastener assembly, and is not intended to limit the light module fastener assembly to those as illustrated and described herein. Additionally, features illustrated and described with respect to one embodiment could be used in connection with other embodiments.

Figure 2:
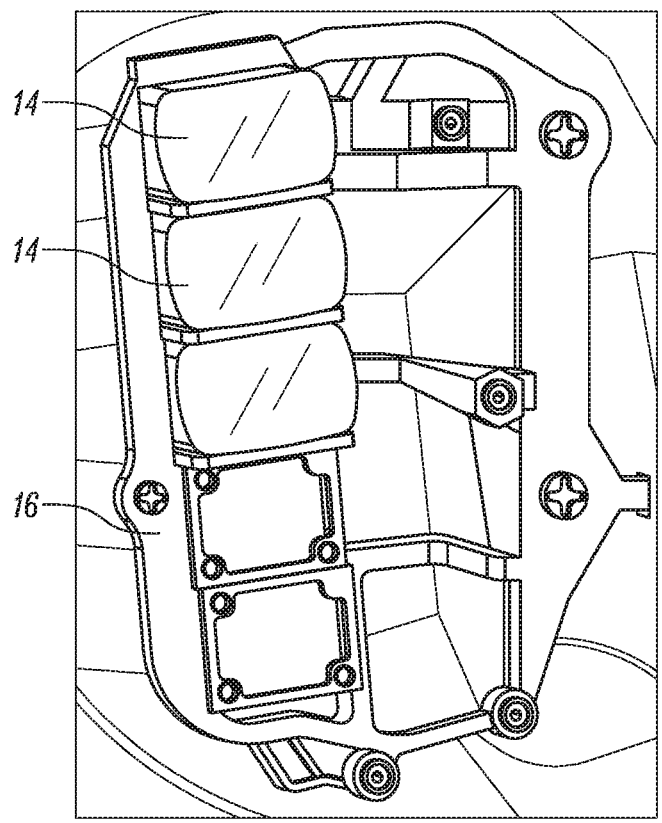
FIG. 2 is a front view of a headlamp assembly used in the vehicle of FIG. 1, shown with a front headlamp glass removed.

Referring to FIG. 1, an exemplary vehicle 10 is illustrated having exemplary headlight assemblies 12. FIG. 2 illustrates a portion of the headlight assembly 12 revealing exemplary LED light modules 14 secured to an exemplary adjustable carrier bracket 16. Individual light modules 14 are mounted to the carrier bracket 16 at various points, which necessitates the need to independently adjust each light module 14 relative to the next for proper aiming. The carrier bracket 16 is adjustable to provide simultaneous adjustment of all the light modules 14. The light modules can utilize one or more of various types of light sources, such as LED for example, and can vary in size and shape.

Figure 3A:
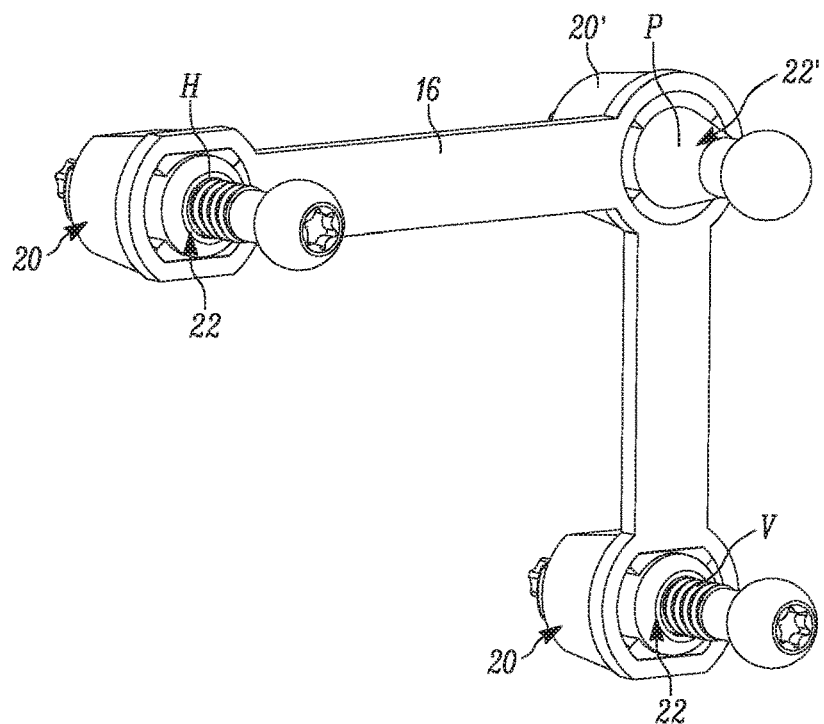
FIG. 3A is a front perspective view of a portion of an exemplary adjustable carrier bracket with a plurality of fastening assemblies.
Figure 3B:
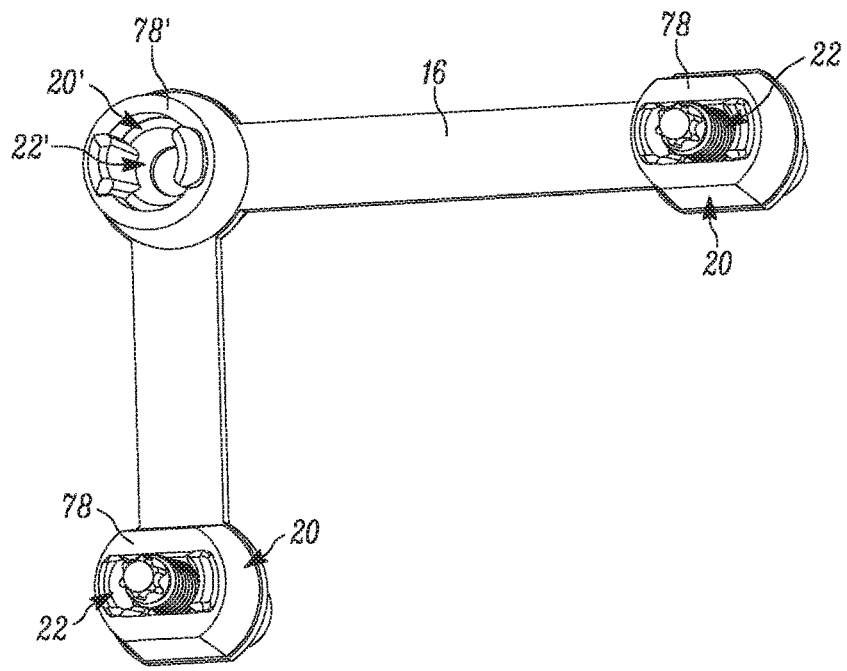
FIG. 3B is a rear view of the adjustable carrier bracket of FIG. 3A.

Referring to FIGS. 3A and 3B, a representative portion of the adjustable carrier bracket 16 is shown with the addition of a plurality of exemplary fastening assemblies 18, which are used to secure the light modules to the adjustable carrier bracket 16. For illustrative purposes FIGS. 3A and 3B depict only a portion of the carrier bracket 16, it is to be understood that the carrier bracket 16 can vary in size and shape to accommodate various light modules, installation requirements, and fastening assemblies 18. The fastening assemblies 18 can vary in number and design to provide a suitable mounting and aiming configuration for each light module 14.

Each fastening assembly 18 includes a carrier receptacle 20 formed in or otherwise secured to the carrier bracket 16, wherein each carrier receptacle 20 is engaged with a respective snap wedge assembly that in turn is securable to the light module 14. The snap wedge assemblies can include both adjustable snap wedge assemblies 22 (securable to carrier receptacle 20) and non-adjustable snap wedge assemblies 22' (securable to carrier receptacle 20'), as discussed in detail below. Adjustable snap wedge assemblies 22 can be used to allow horizontal and vertical aiming for the light module 14, while non-adjustable snap wedge assemblies 22' can provide fixed length pivotable securement for the light module 14 where needed. For example, when secured to a light module 14 the snap wedge assembly 22 further identified with the letter H in FIG. 3A, can be adjusted to vary the horizontal aim of the light module 14, while the snap wedge assembly 22 further identified with the letter V, can be adjusted to vary the vertical aim of the light module 14. Further, the snap wedge assembly 22' further identified with the letter P can serve to provide a non-adjustable fixed pivot securement for the light module 14. As shown, only three fastener assemblies 18 are shown, which can be sufficient to provide securement and aiming of the light module 14, although more or less fastener assemblies 18 can be utilized to accommodate various light module 14 and carrier bracket 16 configurations. Further for illustrative purposes, the carrier receptacles discussed herein are identified and shown at times as distinct elements, although it should be understood that they are, in at least some embodiments, integrally formed and arranged in a carrier bracket 16.

Referring now to FIGS. 4A, 4B, 4C, and 4D, in at least some embodiments, the snap wedge assembly 22 can include a snap wedge insert 30 in threaded engagement with a ball stud 32. The insert 30 includes an insert passage 34 that receives the ball stud 32 therethrough and is configured to engage a plurality of threads 36 on the ball stud 32. The insert 30 includes an insert first end 38 and an insert second end 40. In at least some embodiments, the insert 30 includes a plurality of snap fingers 42 each having an elongated flexible portion 44 and a latching portion 46. In addition, the insert 30 can further include a plurality of wedges 50. In at least some embodiments, the wedges 50 can include a wedge top surface 52 and wedge side surfaces 54, wherein the wedges 50 generally protrude from the insert 30 to provide at least one of lateral and rotational securement, as discussed below.

In at least some embodiments, the ball stud 32 includes a terminal end 60 and a ball end 62, wherein the ball end 62 is configured to interlock with a mating portion of the light module 14 to pivotably secure the light module 14 to the carrier bracket 16, and the terminal end 60, as well as the ball end 62, can include indentations or protrusions configured to engage an adjustment tool for rotating the ball stud 32 to perform an aiming adjustment for the light module 14. The ball end 62 can vary in size and shape to accommodate coupling to the light module 14.

As noted above, the snap wedge assembly 22 is secured to the carrier bracket 16 by engagement with the carrier receptacles 20. Further referring to FIGS. 4A, 4B, 4E, and 4F, the carrier receptacle 20 is shown in dashed lines to illustrate various internal features. The carrier receptacle 20 includes an interior receptacle passage 70 that extends therethrough. The receptacle passage 70 includes a receptacle interior surface 72 with various features that are sized and shaped to interface and secure the insert 30 while allowing for rotation of the ball stud 32 during an aiming adjustment. In at least some embodiments, the receptacle interior surface 72 includes a plurality of wedge pockets 74 that are sized and shaped to matingly receive the wedges 50 formed on the insert 30. In the exemplary embodiment shown in FIGS. 4A-4D, the wedge pocket 74 has a top pocket wall 75 that is ramped to matingly receive the wedge top surface 52 during insertion of the insert 30. Similarly, the wedge pocket 74 has side pocket walls 76 to fittingly receive the wedge side surfaces 54. The use of complementary shapes for the wedges 50 and wedge pockets 74 provides a positive engagement that secures the insert 30 rotationally inside the carrier receptacle 20 during rotation of the ball stud 32, which occurs during aiming adjustments.

It is desirable for the snap wedge assembly 22 to be pushed into the carrier receptacle 20 without undue concern for over-insertion, which can comprise the security and functionality of the fastening assembly 18. In this regard, in addition to rotational securement, a wedge top surface 52 serves to prevent the insert 30 from being inserted into the receptacle passage 70 beyond a desired point, as the wedge top surface 52 fully abuts with the complementary top pocket wall 75, the insert 30 ceases to move further through the receptacle passage 70. In at least some embodiments, a wedge ledge 77 can also be utilized to provide an insertion limitation, wherein the wedge ledge 77 is formed on the wedge 50 and abuts a complementary passage stop wall 80 formed in the receptacle passage 70. The passage stop wall 80 extends, in at least some embodiments, substantially perpendicular to the top pocket wall 75 to provide a positive stop.

In addition to addressing the desire for an insertion limit, it is also desirable to secure the insert 30 to the carrier receptacle 20 once installed therein. In at least some embodiments, this is accomplished via the snap fingers 42, which flex inwards against a bias when inserted through the receptacle passage 70, and flex outwards once the latching portions 46 have exited the receptacle passage 70. The latching portions 46 are then in abutment or in position to abut with a receptacle rear wall 78 (see also FIG. 3B) of the carrier receptacle 20 and therefore provide lateral securement of the insert 30 to the carrier receptacle 20 in a direction opposite the insertion direction 79. In at least some embodiments, further rotational securement is provided by abutment of the elongated flexible portions 44 of the snap fingers 42 against substantially flat rear step portions 81 that can be included in the receptacle passage 70, and which extend from the top pocket wall 75 to the receptacle rear wall 78.

Figure 4A:
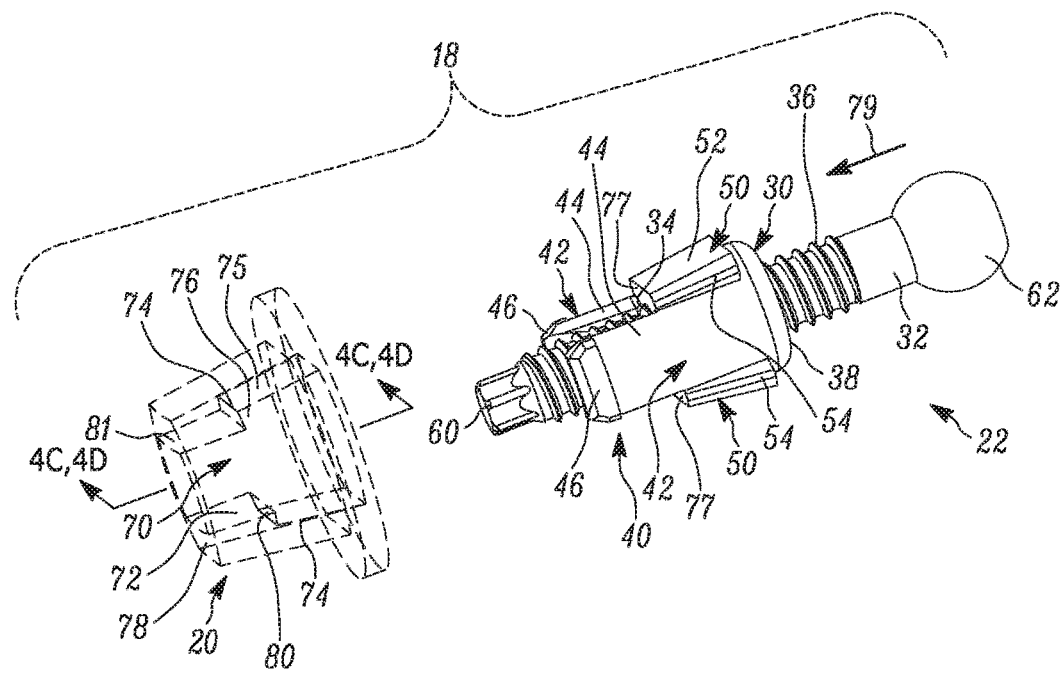
FIG. 4A is a side perspective view of one embodiment of a fastening assembly that includes a snap wedge assembly and a carrier receptacle.
Figure 4B:
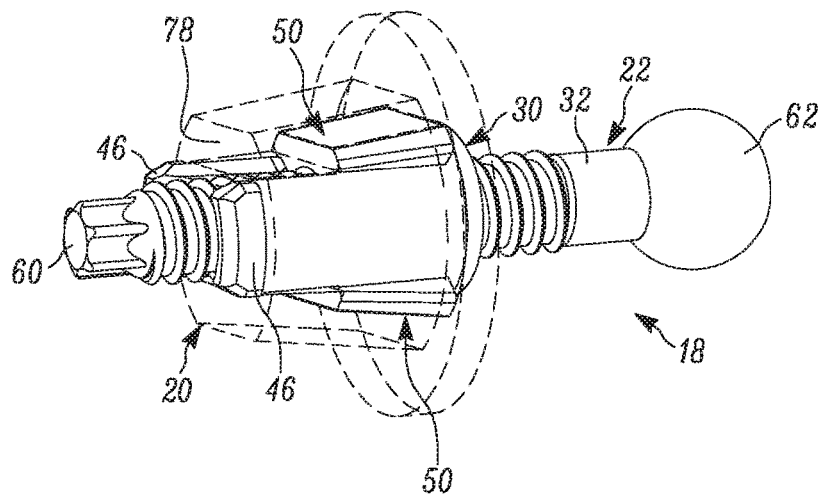
FIG. 4B is a side perspective view of the fastening assembly of FIG. 4A.
Figure 4C:
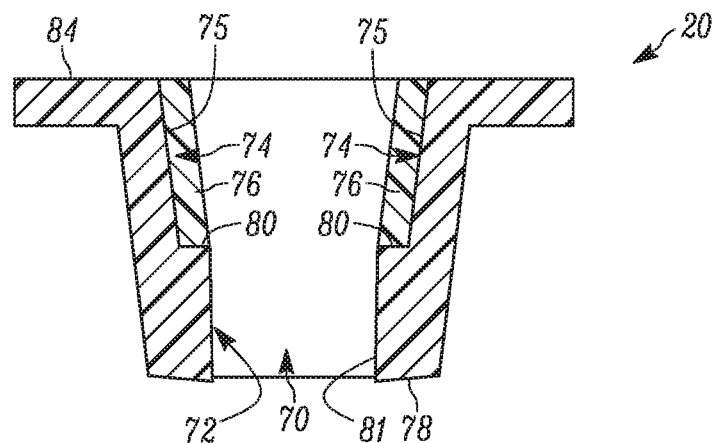
FIG. 4C is a vertical cross-sectional view of the carrier receptacle of FIG. 4A taken along line A-A.
Figure 4D:
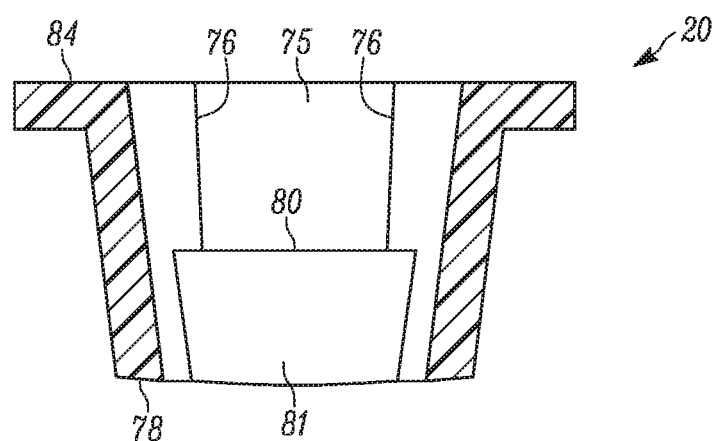
FIG. 4D is a horizontal cross-sectional view of the carrier receptacle of FIG. 4A taken along line B-B.
Figure 4E:
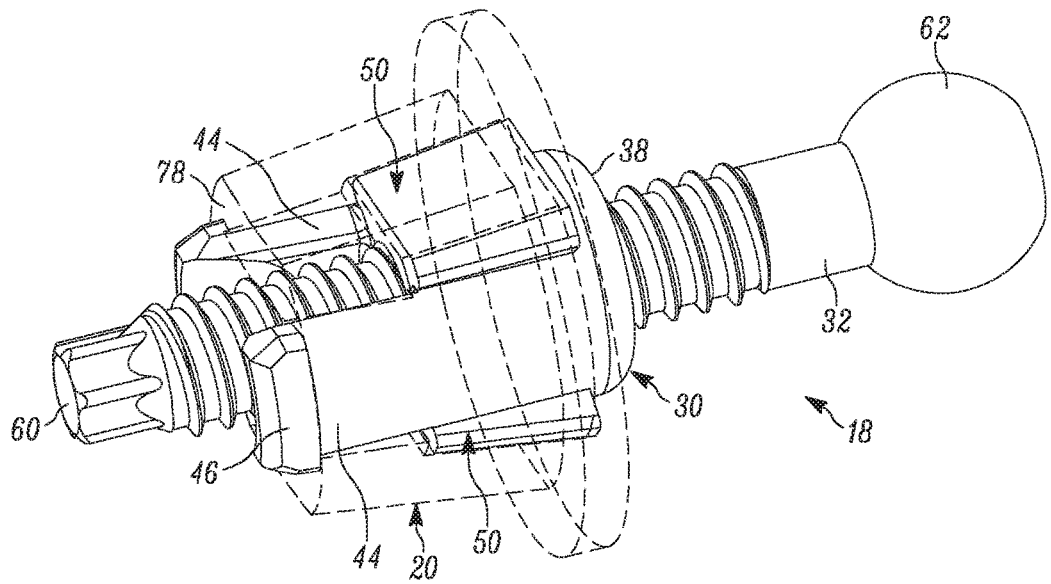
FIG. 4E is a side perspective view of another embodiment of a fastening assembly.
Figure 4F:
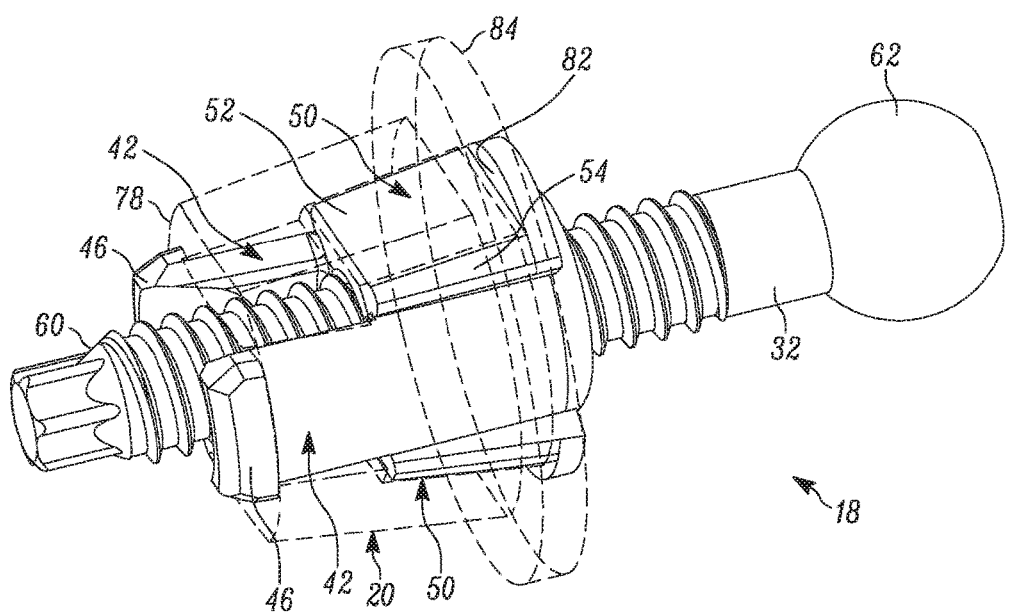
FIG. 4F is a side perspective view of another embodiment of a fastening assembly.

The wedge ledge 77 and the complementary passage stop wall 80 can be omitted from the fastening assembly 18 in at least some embodiments, as seen in FIGS. 4E and 4F. In addition, an insert flange stop portion 82 can be added to the insert first end 38, as shown in FIG. 4F. The insert flange stop portion 82 would abut a receptacle front wall 84 of the carrier receptacle 20 upon the desired insertion of the insert 30, providing a lateral stop in the direction of insertion. As noted above, the wedges 50 can include the wedge top surface 52 and the wedge side surface 54. These portions can vary in size and shape, for example, planar, angled, beveled, conical, etc. Likewise, the complimentary wedge pockets 74 can vary in size and shape to accommodate and matingly engage the wedges 50. For example, FIGS. 4A-4D illustrate exemplary beveled wedge side surfaces 54, while FIG. 4F illustrates exemplary conical wedge side surfaces 54.

Figure 5:
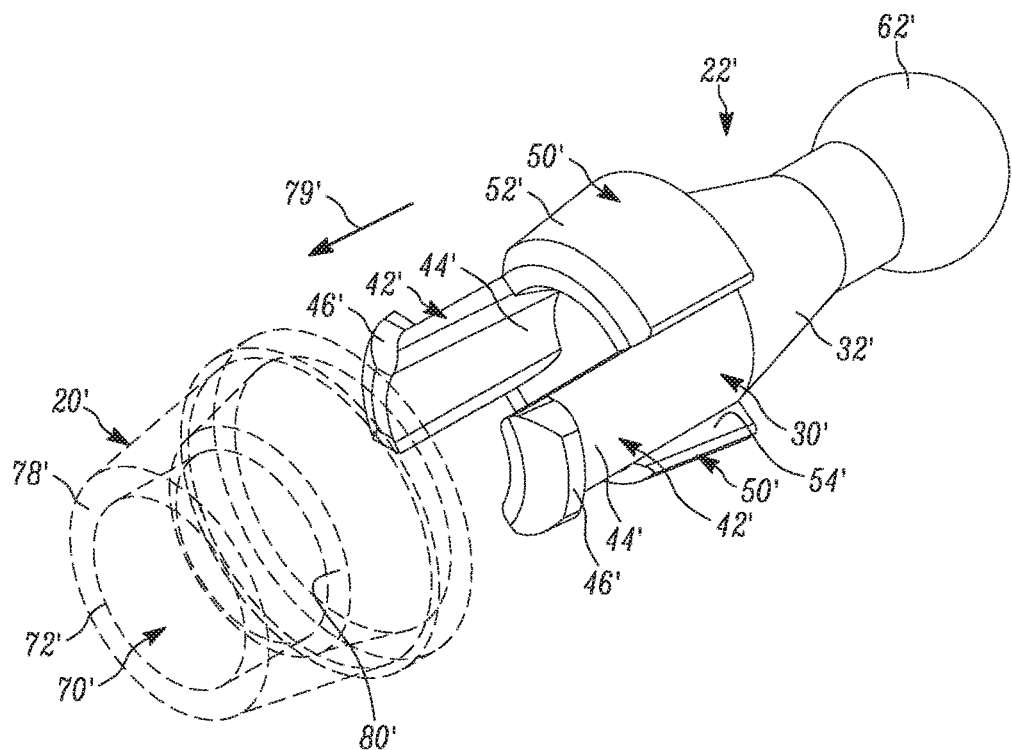
FIG. 5 is a side view of another embodiment of a fastening assembly.

Referring now to FIG. 5, as noted above, the fastening assembly 18 can include both adjustable and non-adjustable snap fit assemblies for engagement and securement of the light module 14 to the carrier bracket 16. The non-adjustable snap wedge assemblies 22' can include elements that are similar in function and design to the adjustable snap wedge assemblies 22, albeit with some with modifications to remove the adjustability feature. These similar elements are identified with the same element number associated with snap wedge assemblies 22, but are followed by a prime symbol (e.g., insert 30 and insert 30'). It is to be understood that elements with similar numbers or names can be identical or can share one or more features with or without modifications to perform the same function, a similar function, or an additional function.

As shown in FIG. 5, the snap wedge assembly 22' includes an insert 30' that can be formed integrally with, or otherwise be non-adjustably secured to, a ball stud 32'. Similar to the aforementioned insert 30, insert 30' includes snap fingers 42' that each having an elongated flexible portion 44' and a latching portion 46', wherein upon full insertion of the insert 30', the latching portions 46' engage a receptacle rear wall 78' to secure the insert 30' from lateral movement in a direction opposite the insertion direction 79'. In addition, the insert 30' can further include a plurality of wedges 50' to provide lateral and rotational securement. In at least some embodiments, the wedges 50' can include a wedge top surface 52' and a wedge side surface 54'. A carrier receptacle 20' is provided to interface with the insert 30' and includes an interior receptacle passage 70' that extends therethrough. The receptacle passage 70' includes a receptacle interior surface 72' with various features that are sized and shaped to receive and secure the insert 30'. In at least some embodiments, the receptacle interior surface 72' is tapered to matingly receive the wedge top surfaces 52' to provide a positive stop and lateral securement in the insertion direction 79'. In addition, in at least some embodiments, the wedge 50' can include a wedge ledge 77' to provide a lateral insertion limitation, wherein upon insertion, the wedge ledge 77' abuts a complementary passage stop wall 80' formed in the receptacle passage 70' to provide a positive stop to prevent further insertion in the insertion direction 79'.

In certain applications it may be desirable to include lugs, tabs, or other protrusions on the insert 30 that engage complementary slots or grooves in the receptacle passage 70 so as to force a particular installation orientation or as a substitute means of providing anti-rotation securement. While the embodiments illustrated in FIGS. 3A-5 show the use of two snap fingers and two wedges, the fastening assemblies 18 could be made to include any number of snap fingers or wedges, and include various other shapes and sizes. For example, FIGS. 7-15C illustrate exemplary inserts having a generally squared shape with four snap fingers and four wedges.

Referring to FIGS. 6A-6F, in some embodiments, the adjustable carrier bracket 16 can have a limited or insufficient depth to utilize the aforementioned carrier receptacle configurations discussed above. In such embodiments, other embodiments can be utilized, as discussed below.

Figure 6A:
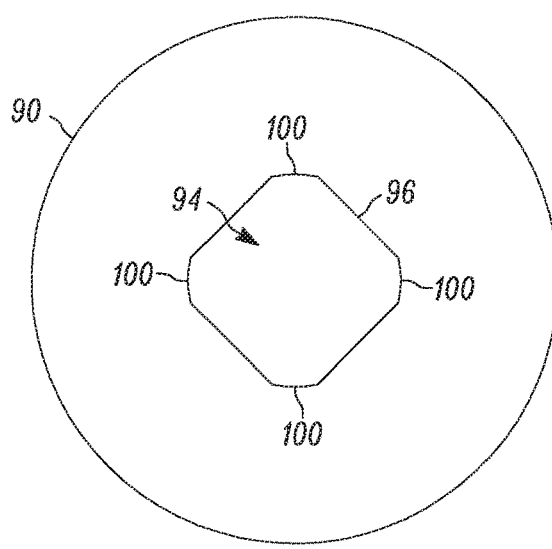
FIG. 6A is a bottom view of another embodiment of a carrier receptacle.
Figure 6B:
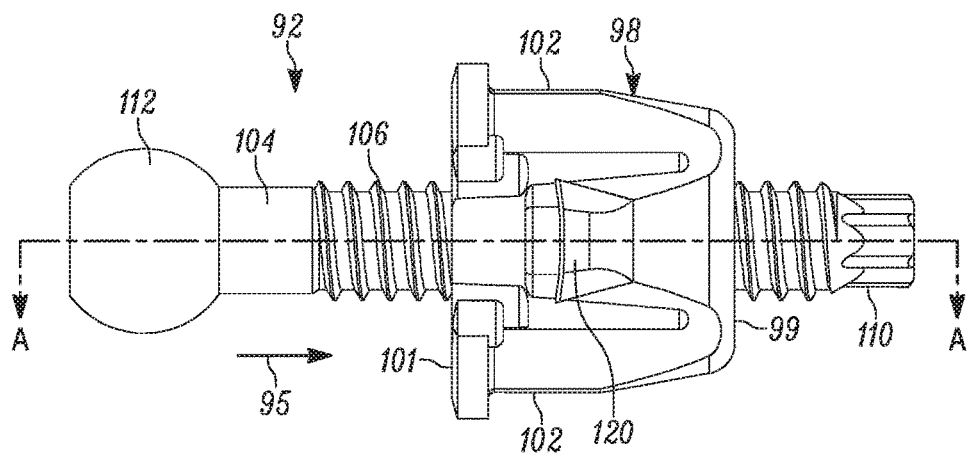
FIG. 6B is a side view of another embodiment of a snap wedge assembly.
Figure 6C:
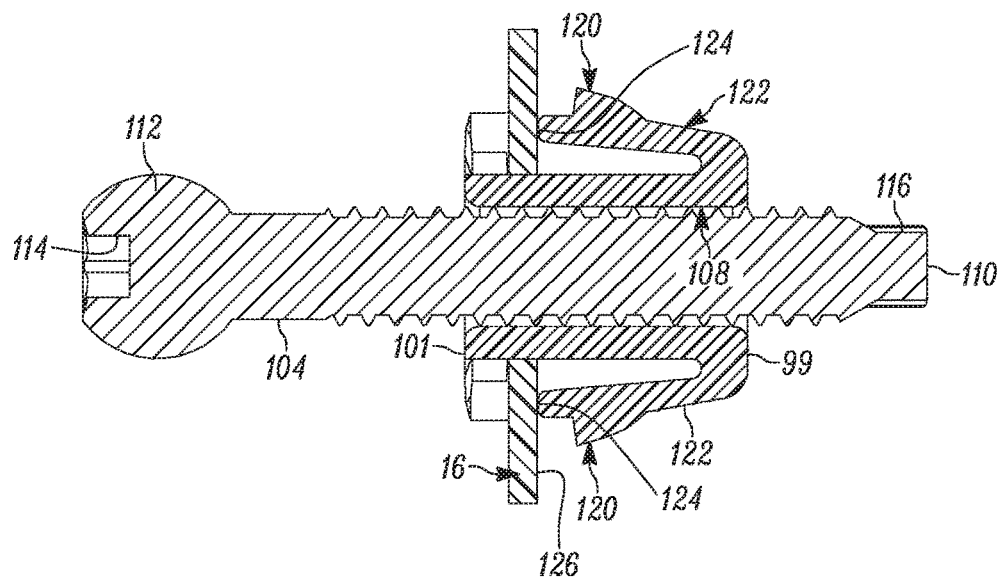
FIG. 6C is a side cross-sectional view of FIG. 6B, taken along line A-A in FIG. 6B with the snap wedge assembly installed in the carrier bracket to form another embodiment of a fastening assembly.
Figure 6D:
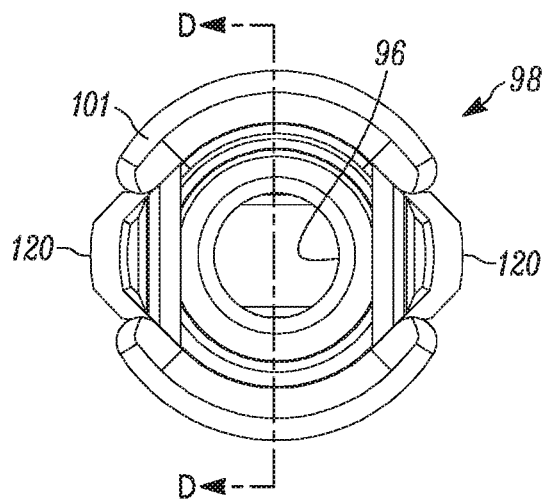
FIG. 6D is a top view of the insert used in the snap wedge assembly of FIG. 6B.
Figure 6E:
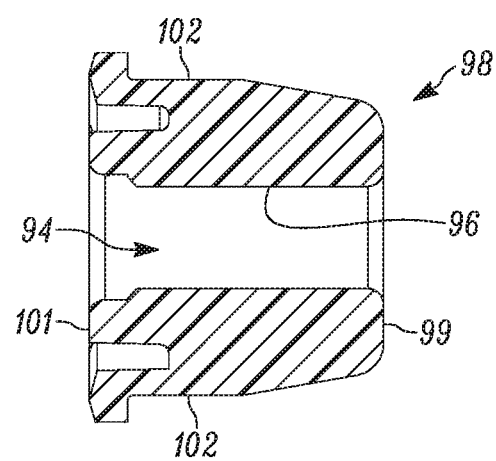
FIG. 6E is a side cross-sectional view of the insert of FIG. 6D, taken along the line D-D in FIG. 6D.
Figure 6F:
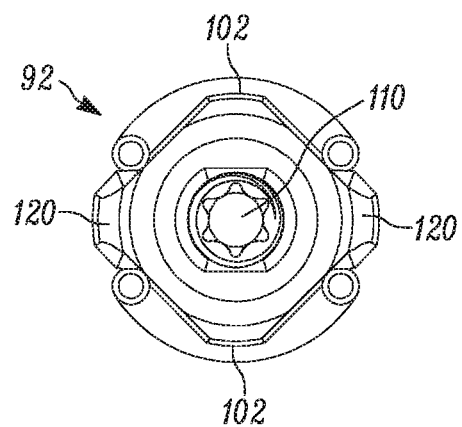
FIG. 6F is a bottom view of the snap wedge assembly of FIG. 6B.
Figure 7:
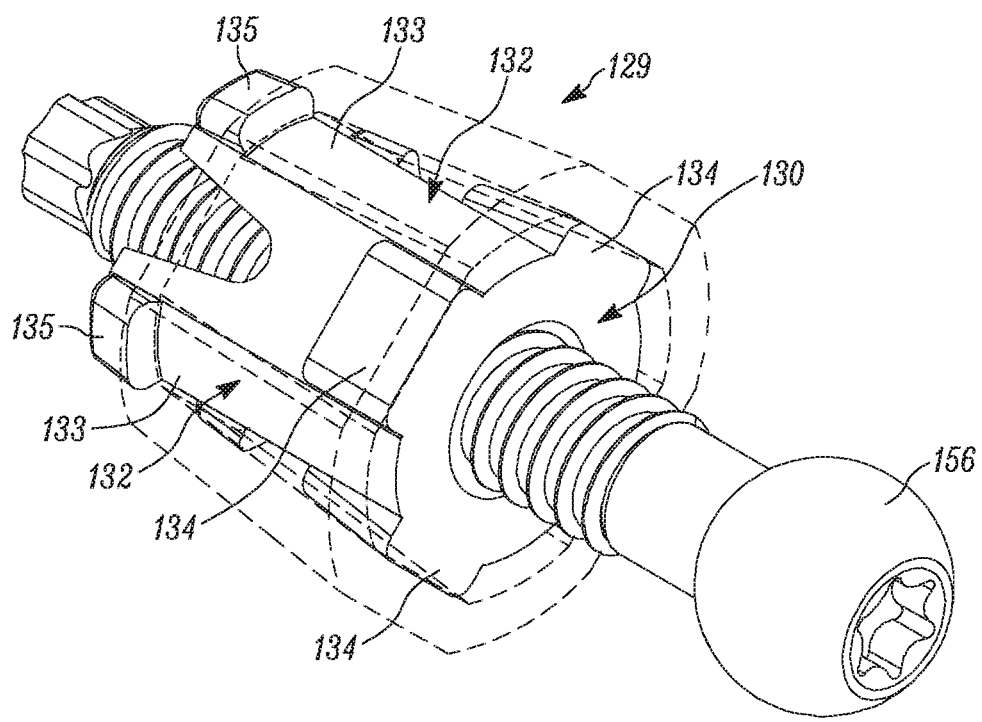
FIG. 7 is a perspective view of another embodiment of a fastening assembly that includes an adjustable snap wedge assembly and a carrier receptacle.
Figure 8A:
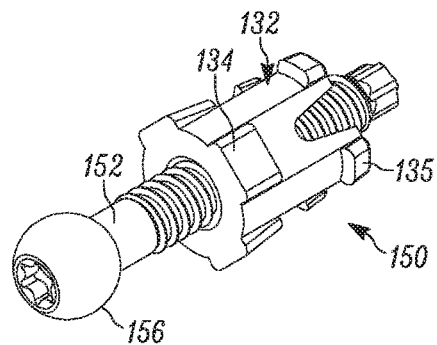
FIG. 8A is a perspective view of the snap wedge assembly of FIG. 7 that includes an insert and a ball stud.
Figure 8B:
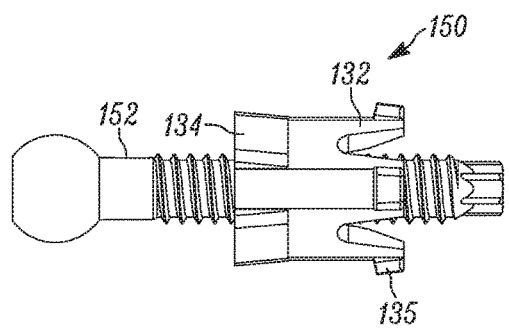
FIG. 8B is a side view of the snap wedge assembly of FIG. 8A.
Figure 8C:
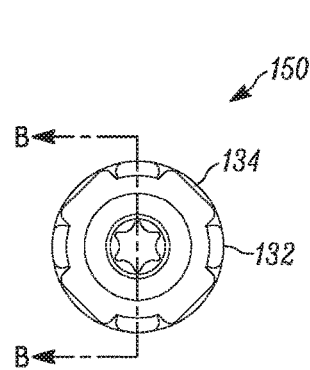
FIG. 8C is a top view of the snap wedge assembly of FIG. 8A.
Figure 8D:
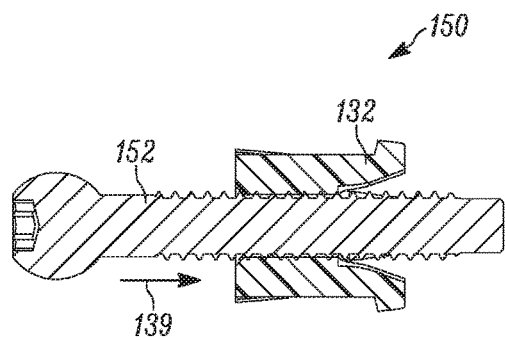
FIG. 8D is a cross-sectional view of the snap wedge assembly of FIG. 8C taken along line B-B.
Figure 9A:
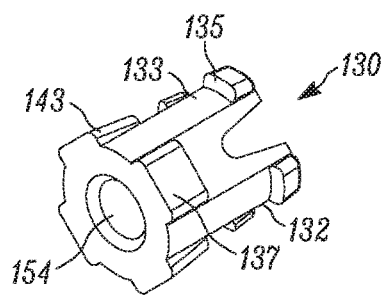
FIG. 9A is a perspective view of the insert of FIG. 7.
Figure 9B:
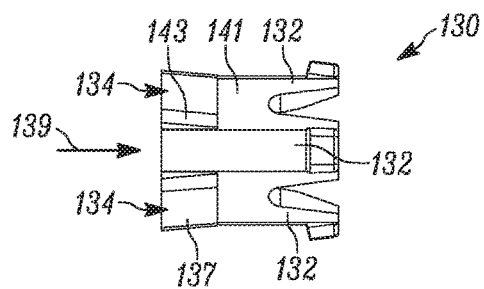
FIG. 9B is a side view of the insert of FIG. 9A.
Figure 9C:
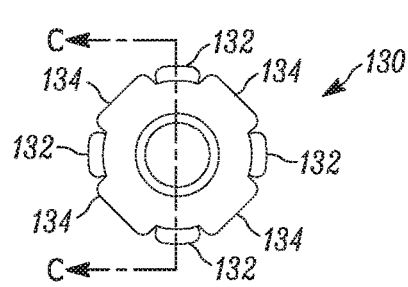
FIG. 9C is a top view of the insert of FIG. 9A.
Figure 9D:
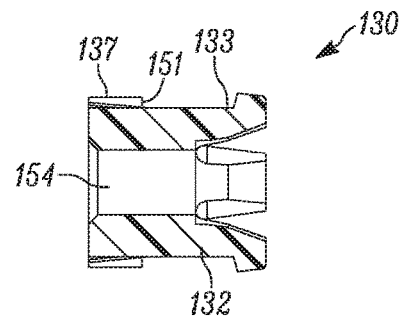
FIG. 9D is a cross-sectional view of the insert of FIG. 9C taken along line C-C.
Figure 10A:
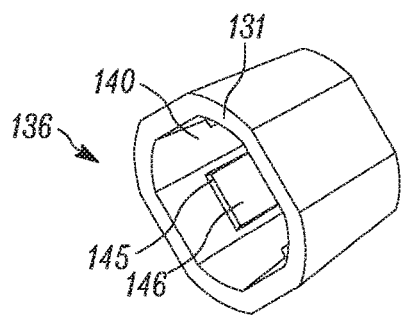
FIG. 10A is a perspective view of the carrier receptacle of FIG. 7.
Figure 10B:
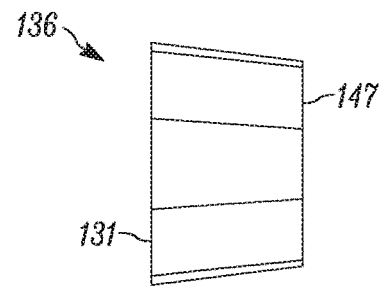
FIG. 10B is a side view of the carrier receptacle of FIG. 10A.
Figure 10C:
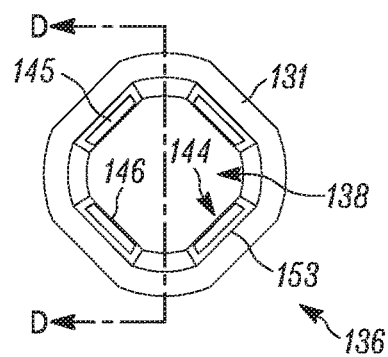
FIG. 10C is a top view of the carrier receptacle of FIG. 10A.
Figure 10D:
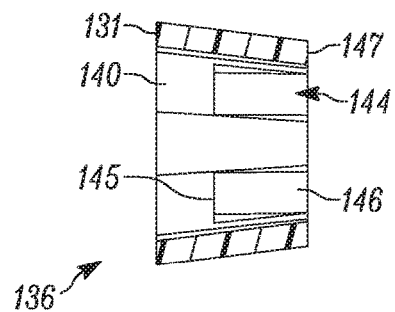
FIG. 10D is a cross-sectional view of the carrier receptacle of FIG. 10C taken along line D-D.
Figure 11A:
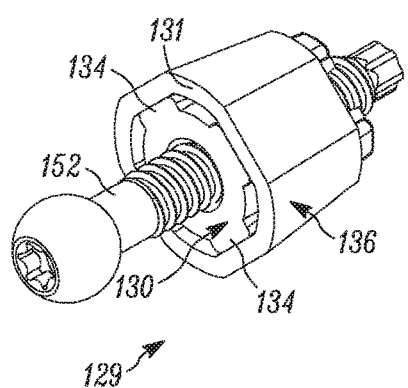
FIG. 11A is another perspective view of the fastening assembly of FIG. 7.
Figure 11B:
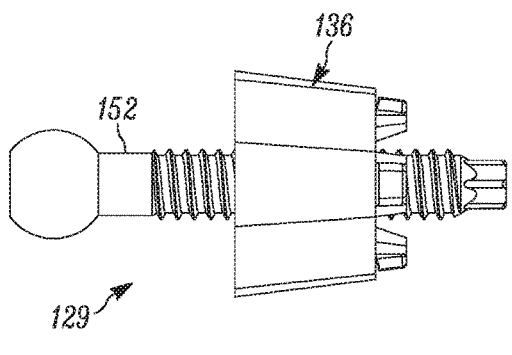
FIG. 11B is a side view of the fastening assembly of FIG. 11A.
Figure 11C:
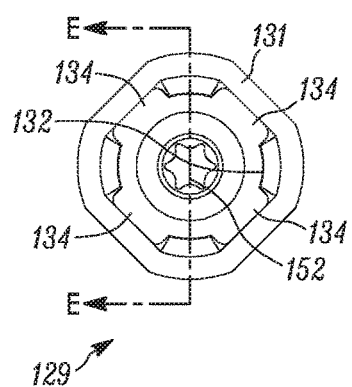
FIG. 11C is a top view of the fastening assembly of FIG. 11A.
Figure 11D:
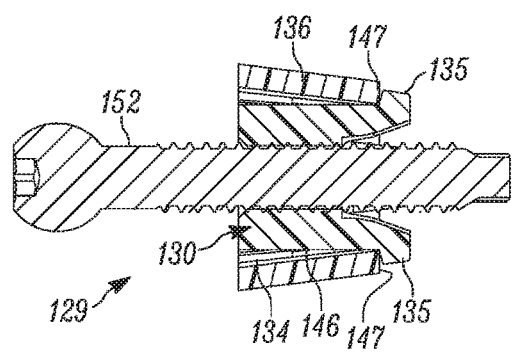
FIG. 11D is a cross-sectional view of the fastening assembly of FIG. 11C taken along line E-E.
Figure 12:
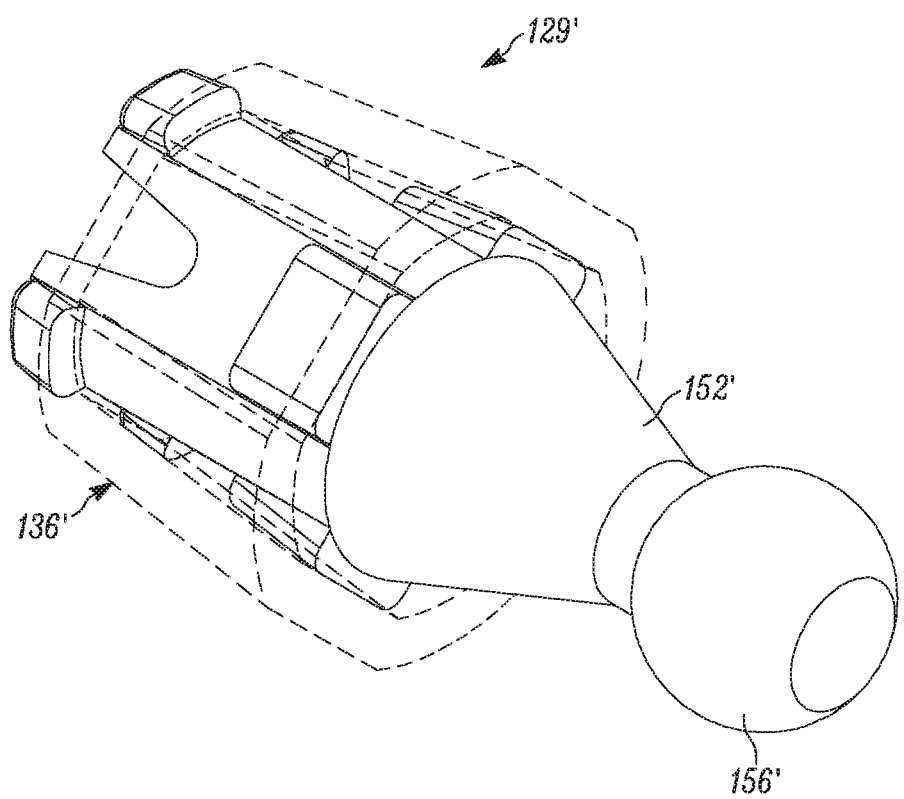
FIG. 12 is a perspective view of another embodiment of a fastening assembly that includes a non-adjustable snap wedge assembly and a carrier receptacle.
Figure 14A:
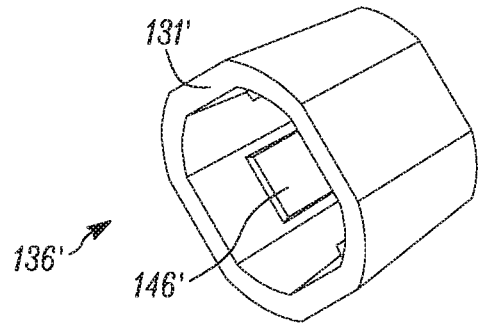
FIG. 14A is a perspective view of the carrier receptacle of FIG. 12.
Figure 14B:
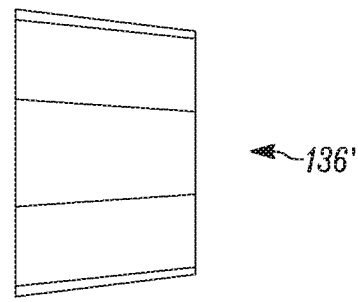
FIG. 14B is a side view of the carrier receptacle of FIG. 14A.
Figure 14C:
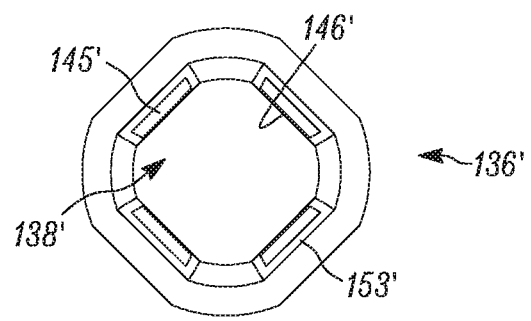
FIG. 14C is a top view of the carrier receptacle of FIG. 14A.
Figure 15A:
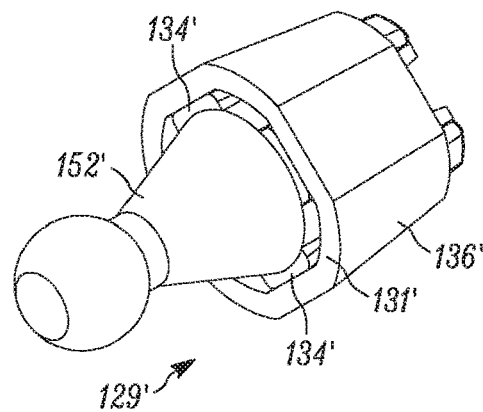
FIG. 15A is another perspective view of the fastening assembly of FIG. 12.
Figure 15B:
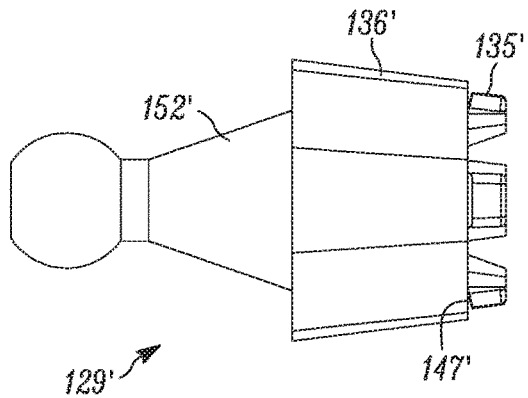
FIG. 15B is a side view of the fastening assembly of FIG. 15A.
Figure 15C:
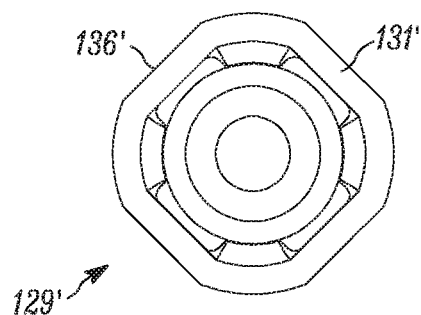
FIG. 15C is a top view of the fastening assembly of FIG. 15A.

As shown in FIG. 6A, a carrier receptacle 90 is provided that includes a receptacle passage 94 with a receptacle interior surface 96 with various features that are sized and shaped to receive and secure an insert 98 of a snap wedge assembly 92. More particularly, the receptacle interior surface 96 includes a generally square shape having beveled corners 100 to provide anti-rotation securement when engaged with rotation stops 102 on the insert 98, which are sized and shaped to complementarily engage the corners 100. Further, the snap wedge assembly 92 includes the insert 98 and a ball stud 104. Although the illustrated snap wedge assembly 92 is adjustable, utilizing a threaded engagement between ball stud threads 106 and an insert passage 108, in at least some embodiments, the ball stud 104 can be integrally formed with or otherwise permanently secured to the insert 98 to form a non-adjustable snap wedge assembly. Similar to the aforementioned ball stud 32, the ball stud 104 includes a terminal end 110 and a ball end 112, wherein the ball end 112 is configured to engage with a mating portion of the light module 14, and the terminal end 110, as well as the ball end 112, can include indentations 114 or protrusions 116 configured to engage an adjustment tool for rotating the ball stud 104 to perform an aiming adjustment for the light module 14.

The insert 98 further includes a rear wall 99 and front wall 101, as well as a plurality of snap fingers 120 each having an elongated flexible portion 122 and a latching portion 124. As discussed above, the snap fingers flex inwards when inserted into the receptacle passage 94 in an insert direction 95, and flex outwards when exiting the receptacle passage 94, to provide abutment of the latching portions 124 against a rear wall 126 of the carrier receptacle 90. In this manner the snap wedge assembly 92 can be laterally secured in the carrier bracket 16 and aiming adjustments can be made.

While various embodiments illustrated in FIGS. 3A-5 show the use of various configurations designed to interlock an insert with a carrier receptacle, such as through the use of two snap fingers and two wedges having particular shapes and sizes, the quantity of such interlocking features (e.g., snap fingers, wedges, etc.) can vary. In addition, the shape and size of the features can also vary (e.g., triangular shape, etc.). FIGS. 7-15C illustrate additional embodiments of a fastener assembly 129 having an adjustable snap wedge assembly that includes an insert 130 with four snap fingers 132 and four wedges 134. The snap fingers 132 include an elongated flexible portion 133 and a latching portion 135. The wedges 134 can each include a top wedge surface 137 (FIG. 9D) that decreases in thickness as the top wedge surface 137 extends in an insertion direction 139 along an insert outer wall 141, as well as top wedge sides 143. To complement the insert 130, a carrier receptacle 136 is provided that is integrally formed with or otherwise secured to the carrier bracket 16. The carrier receptacle 136 includes a receptacle front wall 131 and receptacle rear wall 147 with a receptacle passage 138 therebetween, the receptacle passage 138 having a receptacle interior surface 140 with various features that are sized and shaped to receive and secure the insert 130. In at least some embodiments, the receptacle interior surface 140 includes a plurality of wedge stops 144 each having a passage stop wall 145 and a top surface 146 that, in at least some embodiments, generally decreases in thickness as the top surface 146 extends in an insertion direction 139. The passage stop walls 145 are generally perpendicular to the top surface 146 and are configured to directly abut wedge ledges 151 formed on each wedge 134, which occurs when the insert 130 is seated at the desired depth inside the carrier receptacle 136. In this manner, the abutment of the wedge ledges 151 and the abutment of the top wedge surfaces 137 with the receptacle interior surface 140 provides rotational securement and lateral securement in the insertion direction 139. In addition, upon full insertion of the insert 130, the latching portions 135 flex outwardly to engage the carrier receptacle rear wall 147 to provide lateral securement in a direction opposite the insertion direction 139. Combining the insert 130 with a ball stud 152 forms a snap wedge assembly. In the case of an adjustable snap wedge assembly 150 (FIGS. 7-11D), the ball stud 152 is threadingly engaged with an insert inner wall 154, in this manner the ball stud 152 can be rotated relative to the insert 130 to provide aiming adjustment for a light module 14 secured to a ball end 156 of the ball stud 152.

A fastener assembly 129' that includes a non-adjustable snap wedge assembly 150' is illustrated in FIGS. 12-15C. The non-adjustable snap wedge assembly 150' includes a similar arrangement to the adjustable snap wedge assembly 150, with the exception that the ball stud 152' is formed integrally with or otherwise permanently secured to the insert 130'. The insert 130' is inserted into the carrier receptacle 136' for securement using the wedges 134' and snap fingers 132' as described above. In this manner, the light module 14 can be secured to the ball end 156' of the ball stud 152' at points along the light module 14 where no adjustment is necessary to provide a secure pivot point for the light module 14.

This invention relates primarily to adjusters and mounts for LED light modules used in vehicle headlamps. It may also be used in other applications where similar performance characteristics are desired and the description herein of the invention used in automotive headlamps should not been interpreted as limiting use to such an environment. It is specifically intended that the fastener assembly not be limited to the specific embodiments and illustrations contained herein, but include modified forms of those embodiments including portions of the embodiments and combinations of elements of different embodiments as come within the scope of the following claims. Accordingly, the foregoing description is meant to be exemplary only, the invention is to be taken as including all reasonable equivalents to the subject matter of the invention, and should not limit the scope of the invention set forth in the following claims. The use of the term plurality is intended to include one or more.

What is claimed is:

1. A snap wedge assembly comprising:
   a ball stud having a ball end configured for engagement with a light module; and
   an insert coupled with the ball stud, the insert comprising:
      an insert first end and an insert second end;
      a plurality of wedges, each having wedge side surfaces and a wedge top surface, the plurality of wedges extending from the insert first end towards the insert second end, wherein the plurality of wedges taper to a reduced size as they extend away from the ball end; and
      a plurality of snap fingers, the snap fingers each including an elongated flexible portion and a latching portion.

2. The snap wedge assembly of claim 1, wherein the ball stud includes a plurality of threads, and the insert includes an insert passage that receives the ball stud and engages the threads to allow rotation of the ball stud to selectively move the ball stud through the insert passage.

3. The snap wedge assembly of claim 2, wherein the wedge top surface is substantially planar and the insert includes at least two wedges situated on opposite sides of the insert.

4. The snap wedge assembly of claim 3, wherein the wedge side surfaces extend from opposing sides of the wedge top surface and are at least one of conical, beveled, and planar.

5. The snap wedge assembly of claim 4, further including a wedge ledge that extends from the wedge top surface, wherein the wedge ledge extends substantially perpendicular to the wedge top surface.

6. The snap wedge assembly of claim 5, wherein the ball stud includes a terminal end, opposite the ball end, and wherein the terminal end includes recessed indentations for engagement with an adjustment tool for rotating the ball stud to perform an aiming adjustment of a secured lighting module.

7. The snap wedge assembly of claim 1, wherein the ball stud is permanently coupled with the insert to provide simultaneous movement therewith, and the wedge side surfaces extend from opposing sides of the wedge top surface.

8. The snap wedge assembly of claim 7, wherein the wedge top surface is substantially curved.

9. A fastening assembly for securing a light module to a carrier bracket of a vehicle headlamp assembly, the fastening assembly comprising:
   a snap wedge assembly comprising:
      a ball stud having a ball end configured for engagement with a light module; and
      an insert coupled with the ball stud, the insert comprising:
         an insert first end and an insert second end;
         a plurality of wedges each having side surfaces and a top surface that extends longitudinally from the insert first end towards the insert second end; and
         a plurality of snap fingers, the snap fingers each including an elongated flexible portion and a latching portion; and
   a carrier receptacle for matingly receiving and securing the snap wedge assembly, wherein the carrier receptacle is at least one of formed integrally with or securable to a carrier bracket, the carrier receptacle comprising:
      a receptacle front wall and a receptacle rear wall; and
      a receptacle passage having an at least partially tapered receptacle interior surface extending between the receptacle front wall and the receptacle rear wall.

10. The fastening assembly of claim 9, wherein the receptacle interior surface tapers as it extends from the receptacle front wall to the receptacle rear wall, thereby narrowing the receptacle passage.

11. The fastening assembly of claim 9, further comprising:
   a ledge that extends from the top surface, wherein the ledge extends substantially perpendicular to the top surface; and
   a passage stop wall formed in the receptacle passage positioned to abut the ledge when the insert is inserted inside the receptacle passage.

12. The fastening assembly of claim 9, wherein the insert further includes an insert flange stop portion that abuts the receptacle front wall of the carrier receptacle during insertion of the insert into the receptacle passage, providing a lateral stop in the direction of insertion.

13. The fastening assembly of claim 9, wherein the ball stud is integrally formed with or laterally secured to the insert.

14. The fastening assembly of claim 9, wherein the ball stud includes a plurality of threads, and the insert includes an insert passage that receives the ball stud and engages the threads to allow rotation of the ball stud to selectively move the ball stud through the insert passage.

15. The fastening assembly of claim 14, wherein the ball end is coupled to the light module and the carrier bracket forms an adjustable portion of a vehicle headlight assembly.

16. A vehicle headlight assembly comprising:
   a plurality of snap wedge assemblies, at least one of the snap wedge assemblies comprising:
      a ball stud having a ball end configured for engagement with a light module; and
      an insert coupled with the ball stud, the insert comprising:
         an insert first end and an insert second end;
         a plurality of wedges each having side surfaces and a top surface that extends longitudinally from the insert first end towards the insert second end, wherein the wedge top surface tapers as it extends in a direction away from the ball end; and
         a plurality of snap fingers, the snap fingers each including an elongated flexible portion and a latching portion; and
   a plurality of carrier receptacles for matingly receiving and securing the snap wedge assemblies, wherein the carrier receptacles are at least one of formed integrally with or securable to a carrier bracket, at least one of the carrier receptacles comprising:
      a receptacle front wall and a receptacle rear wall; and
      a receptacle passage having a tapered receptacle interior surface extending between the receptacle front wall and the receptacle rear wall, wherein the ball ends of the plurality of snap wedge assemblies are all coupled to a single light module.

17. The vehicle headlight assembly of claim 16, wherein the plurality of snap wedge assemblies include at least one adjustable snap wedge assembly, wherein the ball stud of at the least one adjustable snap wedge assembly includes a plurality of threads, and the associated insert includes an insert passage that receives the ball stud and engages the threads to allow rotation of the ball stud to selectively move the ball stud through the insert passage.

18. The vehicle headlight assembly of claim 17, wherein the plurality of snap wedge assemblies include at least one non-adjustable snap wedge assembly, wherein the ball stud of the at least one non-adjustable snap wedge assembly is integrally formed with or laterally secured to an associated insert.

19. The vehicle headlight assembly of claim 18, wherein the plurality of snap wedge assemblies include at least two adjustable snap wedge assemblies, a first adjustable snap wedge assembly for adjusting the vertical aim of the light module, and a second adjustable snap wedge assembly for adjusting the horizontal aim of the light module.

20. The vehicle headlight assembly of claim 19, wherein the carrier bracket includes multiple groupings of two adjustable snap wedge assemblies with one non-adjustable snap wedge assembly, and wherein each grouping is secured to a separate light module.

21. A snap wedge assembly comprising:
   a ball stud having a ball end configured for engagement with a light module; and
   an insert integrally formed with the ball stud, the insert comprising:
      a plurality of snap fingers, the snap fingers each including an elongated flexible portion extending longitudinally away from the ball stud and terminating in a latching portion; and
      a plurality of wedges that taper to a reduced size as they extend in a direction away from the ball end.

\* \* \* \* \*